March 24, 1942. T. MOJONNIER ET AL 2,277,526
VAT
Filed March 7, 1940 9 Sheets-Sheet 3

Inventors
Timothy Mojonnier
Julius J. Mojonnier
and Oliver W. Mojonnier
By Thomas H. Ferguson
Attorney March 24, 1942.   T. MOJONNIER ET AL   2,277,526
VAT
Filed March 7, 1940   9 Sheets-Sheet 4

Inventors
Timothy Mojonnier
Julius J Mojonnier
and Oliver W Mojonnier
By Thomas H. Ferguson
Attorney Patented Mar. 24, 1942

2,277,526

UNITED STATES PATENT OFFICE 2,277,526

VAT

Timothy Mojonnier and Julius J. Mojonnier, Oak Park, and Oliver W. Mojonnier, River Forest, Ill., assignors to Mojonnier Bros. Co., a corporation of Illinois Application March 7, 1940, Serial No. 322,770

10 Claims. (Cl. 257—212)

The present invention relates to vats and more particularly heat exchange vats wherein the substance being treated is mechanically agitated.

One object of the invention is to provide an improved construction for the channels through which the heat exchange medium is passed. In brief, this novel construction makes use of angle irons having rather broad plate-like basic sections and smaller flanges. The plate-like portions are secured together edge to edge and thus form an angle iron wall. The upstanding flanges are secured at their free ends to an associated plate. In this way channels are formed. To provide communication between these channels, portions of the flanges are cut away and sometimes bulkheads or partitions are provided to cooperate with these openings. In other instances the openings alone suffice. Thus prolonged side and bottom channels may be formed.

Another object is to provide novel terminal and junction housings through which the controlling fluid may be passed into and from the channels and from one set of channels to another set. Specifically, the terminal housings provide for the entry and exit of the fluid to the channel system as a whole and the junction housing provides for interconnecting the wall and bottom sets of channels, where both wall and bottom channels are used.

Another object is to so shape and arrange the channels and the terminal and junction housings that suitable heat insulation may be had while keeping the channel and housing parts down to a minimum thickness. To this end the channels and housings are made flat and shallow and the whole, after being covered with insulation, is encased within a suitable casing free of exterior angles or projections. In other words, the novel construction makes it possible to produce an efficient vat which is exteriorly smooth, thereby being sanitary and attractive in appearance.

Other objects have to do with sanitation, economy of manufacture, ease and efficiency in operation, replacement and repair and in details of construction other than those heretofore mentioned.

For a fuller understanding of the invention, reference should be had to the following detailed description taken in connection with the accompanying drawings. For a measure of the scope of the invention reference should be made to the appended claims.

The novel agitator and scraper construction, the bridge arrangement cooperating with the agitator frame and other parts whereby the frame may be readily removed from the vat, and certain other details of construction, which are adapted for use in the new tank constituting the subject matter of the present invention, but not claimed herein, have been divided out of this case and are now fully disclosed and claimed in our divisional application Serial No. 347,653, filed July 26, 1940.

In said drawings.

Throughout these views like characters refer to like parts.

The particular vat which is illustrated includes a peripheral wall A, a bottom B, a top and cover construction C, an agitator D, a baffle E, an inlet housing F, a junction housing G, and an outlet housing H. These housings cooperate with the channels in the wall and bottom to provide a path for the heat exchange medium. A modified housing H' and a modified bottom B' illustrate departures from the preferred embodiment.

In forming the container walls and bottom, we employ for the wall A an inner cylindrical plate or wall 40 which is secured at its lower edge, preferably by welding, to the outer edge of a plate 41 of the bottom B. These plates 40 and 41 constitute the liquid contacting plates of the vat and form the inner shell of the same. They may consist of any desired material. Where milk and milk products are to be placed within the vat, chromium or chromium plated metal is a good non-contaminating metal and may be used to advantage. Obviously, other metals may be employed for these liquid contacting plates. The outer plate 42 of the wall A is likewise cylindrical and of sufficiently greater diameter than the wall 40 to leave a substantial space between the two walls. This enclosing outer plate 42 is connected at its lower edge to the outer edge of a circular plate 43 which forms the lowermost plate or second bottom forming wall of the bottom B. These plates may be secured together in any desired way. These two plates 42 and 43 thus connected constitute the outer shell of the vat. Although the plates 42 and 43 need not be composed of chromium or chromium alloys, yet where such material is employed, the outer surface may be given a fine appearance and the same also constitutes a sanitary surface. This would apply particularly to the peripheral plate 42 which is more exposed to view and to contact. As clearly shown, the upper ends of the wall plates 40 and 42 are connected together by a beveled flange 44 formed upon the outer plate 42 and joined at its upper inner edge to the upper edge of the inner wall plate 40.

In forming the channels for the wall A and bottom B, as before noted, angle irons having broad plate-like sections and relatively short flanges are employed. In making up the peripheral wall A, the angle irons may differ among themselves. In the embodiment illustrated, the uppermost member 45 is in a strict sense a channel bar, since it has two flanges with an intervening plate portion, whereas the others, designated 46, are in a strict sense angle bars, since each, although having a plate portion, has only one flange. Thus, one channel bar and eleven angle bars are used in the wall structure. Each of these bars is bent into a complete loop or ring and its ends are joined together to make it continuous throughout. Then these rings 45 and 46 are slipped, one by one, over the cylindrically formed plate 40 and have their flanges secured to said plate by welding. Obviously, this may be done in different ways. Thus, if the bottom plate 41 be first secured to the wall plate 40, then the vat as thus partially formed may be turned upside down and the channel bar 45 first moved down into the position it is to occupy on the outside of the wall 40. When thus positioned, the free ends of the short flanges are welded to the wall 40. Then the next angle iron ring 46 is slipped over the structure and its plate portion is brought down into bearing against the adjacent wall of the channel iron 45. When this position is reached, the first angle bar 46 is welded to the angle iron 45 throughout their contacting lengths. Likewise, the flange of the first angle bar member 46 is welded to the plate 40. Following this, the second angle bar 46 is similarly positioned and welded. Then the remaining bars 46 are successively positioned and welded, until all of the eleven bars 46 are thus secured in place. Thus, the channel forming members 45 and 46, when in place, have their plate portions upright and their flanges substantially horizontal.

When this positioning and welding of the angle iron members 45 and 46 is completed, then, under the assumption that the wall plate 40 and bottom plate 41 are welded together, as before stated, the channel forming members 47, 48, 49, 50, 51, 52 and 53 may be placed upon the bottom plate 41 and similarly welded together and to the plate. It should be noted that these bottom forming angle irons are not identical, but, starting with a central member, the succeeding members are made larger in diameter so as to successively fit in nested relation, each with a fit to the next succeeding member. In other words, the several bottom forming members have substantially nesting dimensions. Thus, in the embodiment shown, the member 47 has its plate-like portion in the form of a disk and around the periphery of the disk a flange is formed. The next member 48 is in the form of a ring or loop and its inner edge is welded to the member 47, while its outer edge is provided with an upturned flange which is welded to the plate 41. Similarly, the member 49 is a circular ring or loop and its inner edge is welded to the member 48 and its upturned flange is welded to the plate 41. Likewise, the members 50, 51, 52 and 53 are circular loops, of successively larger size and fitted and welded together and to the plate 41. Thus, the set of nesting bottom forming loops have upstanding flanges and substantially horizontal plate portions.

With the wall and bottom construction so formed, the angle iron members form angle iron walls. The angle iron wall formed by the members 45 and 46 is the wall 54, parallel to the plate 40 of the wall A, and that formed by the bottom forming angle iron members 47, 48, 49, 50, 51, 52 and 53 is the wall 55, parallel to the dished plate 41 of the bottom B. These walls 54 and 55 are supplemental to the principal walls formed by the plates 40 and 42 on the one hand and the plates 41 and 43 on the other.

Although the wall forming angle-iron members are circular loops, it is clear that they might be otherwise shaped. An oval form or that of a rectangle with rounded corners might be adopted. In such case, of course, the bottom-forming angle-iron loops would be similarly modified. Perhaps it should also be noted that both the wall and bottom angle-iron loops may be variously made, although commonly it would be best to use rolled metal shapes in forming these angle-iron members. What is said here as to non-circular shapes obviously would not apply where an agitator, such as the agitator D, is employed. In such case the shape would be circular or as nearly circular as possible in manufacture. However, the circular shape may be departed from where the vat is to be used without an agitator. The vat herein disclosed is circular and employs an agitator, as before noted.

Although the wall-forming angle-iron loops come together and are welded together to form closed loops, as in the case of the angle-irons 45 and 46; yet in other cases the loops are not closed, their ends are not brought together and welded together, as in the case of the bottom-forming members 48, 49, 50, 51, 52 and 53. There the ends, for the most part, contact the walls of the gutter, hereinafter referred to. But the term "loop" properly defines both forms.

With the angle-irons cut, shaped and mounted as thus far described, that is to say, without any portions of the flanges being cut away, there would be in the wall A twelve circular channels arranged, one above the other, and in the bottom B there would be six circular channels all concentrically arranged. Now, in order to provide a prolonged path for the flow of the medium through all of these channels, it is necessary to have the flanges cut away at certain points. This may be done so as to provide various paths, one or more. Thus, the different channels may be connected in series or in parallel, in various combinations, as desired. In the embodiment under consideration, the chambers are arranged in parallel with two channels in each set.

Figures 7, 8:
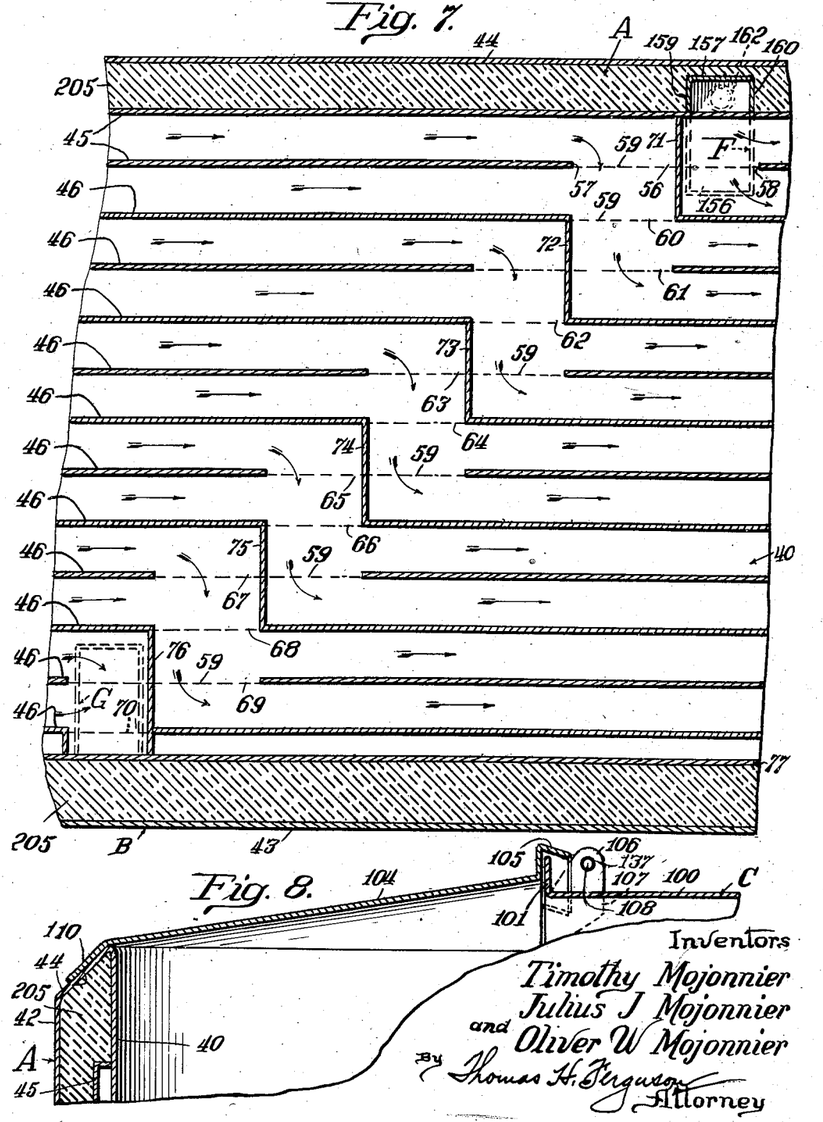
Fig. 7 is a development of a portion of the wall structure of the vat, showing flange openings and associated bulkheads or partitions by which the path of flow of the heat exchange medium through the wall structure is determined, the extent of the developed surface being indicated by the circumferential line extending between the points x and y of Fig. 4 and the position of the section being indicated by the line 7—7 of Fig. 2.
Fig. 8 is a transverse sectional view of a portion of the vat, its bridge and one of the covers carried by the latter, the plane of section being at right angles to that of Fig. 2.
Figure 9:
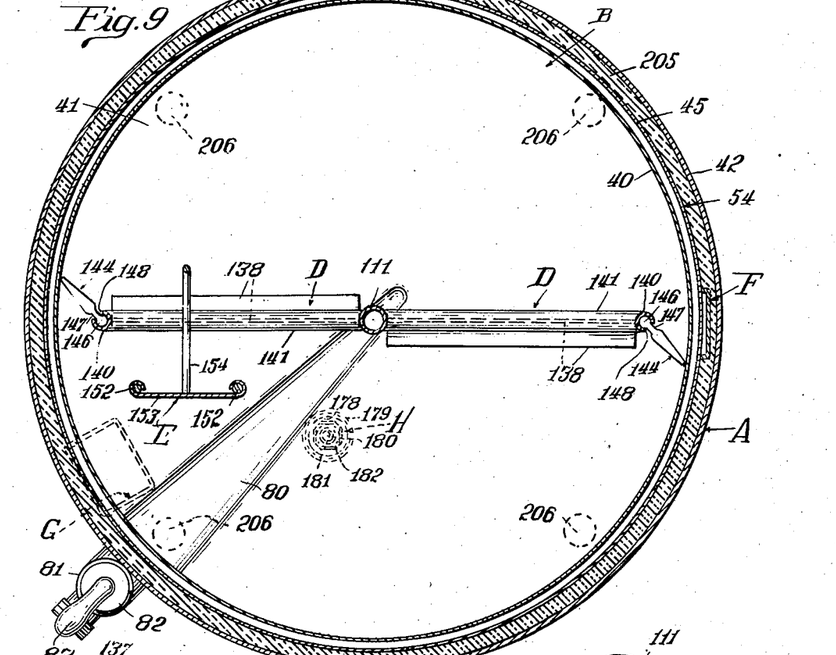
Fig. 9 is a horizontal sectional view taken on a plane indicated by the line 9—9 of Fig. 2 and illustrating the agitator and associated wall scrapers as well as the interior of the vat.

The channel arrangement which is illustrated in Fig. 7 is that just referred to. As shown by the section indicating line 7—7 of Fig. 2, the view is taken inward against the inner wall 40 to which the short flanges of the angle irons are welded, as explained. In the development of Fig. 7, it will be noted that the lower flange of the angle iron member 45 is cut away to provide a wide opening 56 which extends between the points 57 and 58. The cut-away weld is indicated by a dash line 59. The next cut-away portion is made to provide the opening 60 in the flange of the first angle-iron member 46. Here again, the cut-away weld is indicated by a similar dash line 59. This opening 60 is narrower than the opening 56, as is clearly shown. The next opening is a wide opening 61 in the flange of the second member 46. The next opening is a narrow opening 62 in the flange of the third member 46. These are followed successively by a wide opening 63, a narrow opening 64, a wide opening 65, a narrow opening 66, a wide opening 67, a narrow opening 68, a wide opening 69, and a narrow opening 70, formed in the succeeding flanges and off-set laterally, as clearly shown. In each instance the cut-away weld is indicated by a dash line 59, the same as before.

Figure 1:
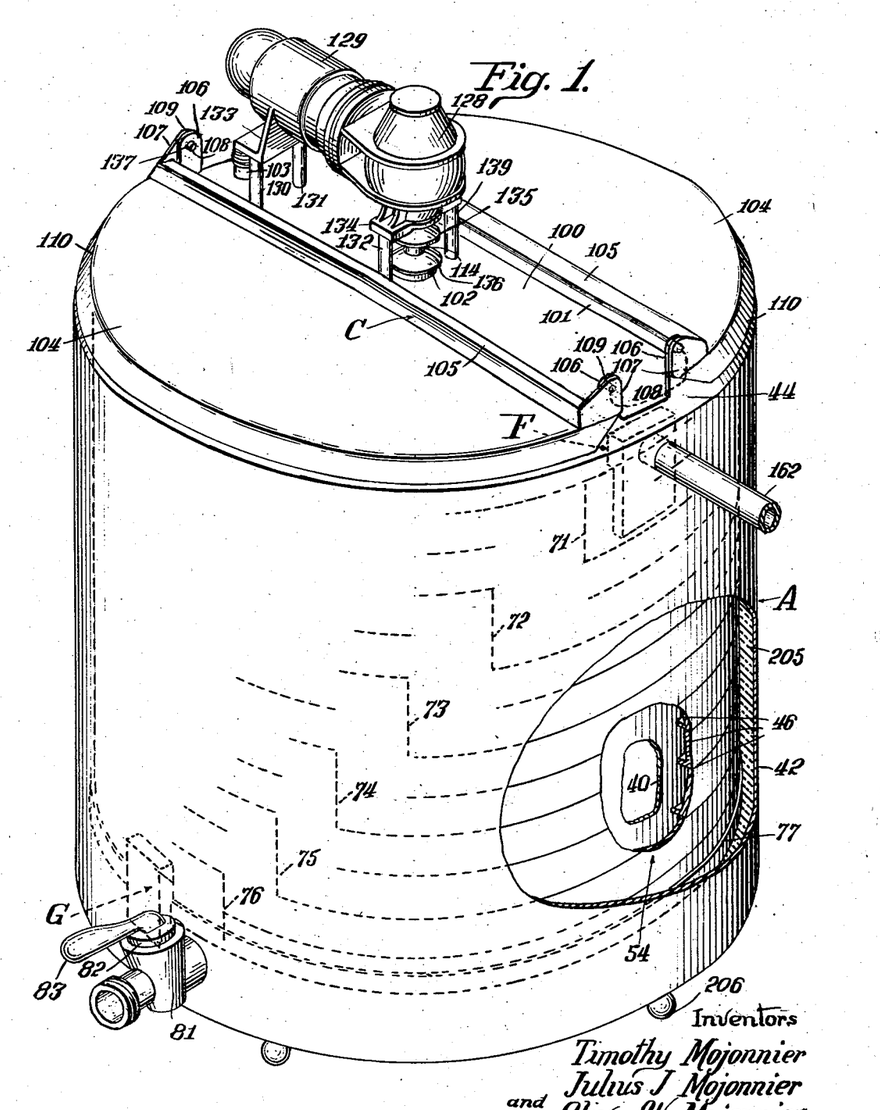
Fig. 1 is a perspective view of a vat constructed and arranged in accordance with the present invention, portions of the side wall structure being broken away to show the various elements which make up the wall, likewise the position of certain of the channel elements being indicated in dash lines, so as to diagrammatically represent the path of travel of the fluid through the wall channels.

Cooperating with this series of wide and narrow openings are bulkheads or partitions. These have the same depth as the flanges of the members 45 and 46 and are welded to the adjacent parts so as to form tight joints and thereby to positively direct the flow of the medium the same as the flanges. The first of these is the bulkhead 71 which unites the upper flange of the member 45 with the flange of the first or uppermost member 46. The second bulkhead 72 unites the flange of the first member 46 to the flange of the third member 46. Again, bulkhead 73 unites the flange of the third member 46 to the flange of the fifth member 46. Again, bulkhead 74 joins the flange of the fifth member 46 to the flange of the seventh member 46. Likewise, bulkhead 75 unites the flanges of the seventh and ninth members 46. Again, bulkhead 76 unites the flanges of the ninth and eleventh members 46. It will be noted also that this bulkhead extends to the lower arm of an angle strip 77 which is used to firmly unite the lowermost angle bar 46 with the bottom plate 41, as clearly illustrated, more particularly in Fig. 2. A partition 78 also unites the flange of the lowermost member 46 to the lower arm of the member 77 at a point adjacent to the junction housing G. In this connection it may be noted that the terminal inlet housing F is located adjacent to the bulkhead 71. In the development of Fig. 7, there are also shown the beveled plate 44 of the wall A and the lowermost plate 43 of the bottom B. It will be noted that the bulkhead 71 bisects the opening 56; the bulkhead 72, the opening 61; the bulkhead 73, the opening 63; the bulkhead 74, the opening 65; the bulkhead 75, the opening 67; and the bulkhead 76, the opening 69. The channel arrangement of Fig. 7 is also shown in dotted lines in Fig. 1, although in the latter figure only the bulkheads are designated. This is done for simplicity and yet by noting their relation to the flanges and openings, it is possible to trace out the meandering path through the wall channels as well in Fig. 1 as in Fig. 7.

With this arrangement it will be seen that a heat exchange medium entering at the housing F will pass to the right from the housing and on through in parallel streams until it returns practically to the bulkhead 71. There the parallel streams will be directed by way of the left-hand portion of the opening 56, the opening 60, and the right-hand portion of the opening 61 into the next lower pair of channels through which it will travel to the right. Upon completing its circuit at this level, this pair of streams will come against the bulkhead 72 and be directed through the left-hand portion of opening 61, the opening 62, and the right-hand portion of the opening 63 into the third pair of channels through which it will travel to the right. Likewise, the path of travel will be continued after the third cycle through the left-hand portion of opening 63, the opening 64, the right-hand portion of the opening 65, and on through the fourth cycle. Then after the fourth cycle the streams will pass through the left-hand portion of opening 65, the opening 66, and the right-hand portion of opening 67. After the fifth cycle the streams will pass through the left-hand portion of the opening 67, the opening 68, and the right-hand portion of the opening 69. Then, after the final cycle the parallel streams will enter the junction housing G and pass into the channels of the bottom B. This is in accordance with the detailed illustration.

Figures 31, 32, 33:
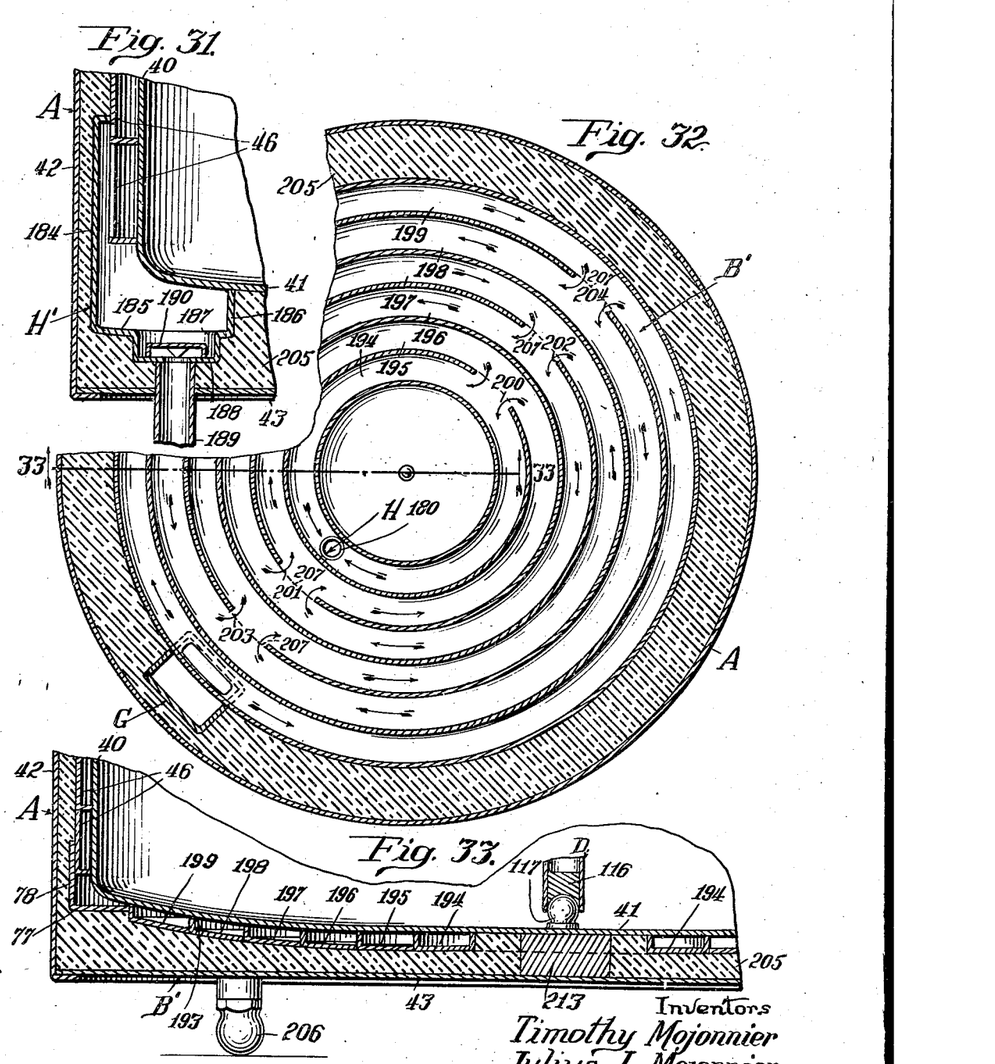
Fig. 31 is a view similar to Fig. 25 but illustrates a terminal housing such as would be used were the vat made up without bottom channels.
Fig. 32 is a view similar to Fig. 4 but illustrating a modified arrangement of angle iron loops wherein there are no radial bulkheads or partitions and wherein the flow of the medium will be reversed in its flow from the inlet housing to the outlet housing.
Fig. 33 is a sectional view of the modified structure of Fig. 32, the plane of section being indicated by the line 33—33 of Fig. 32.

In some instances the fluid might pass away from the vat altogether at this point. In such case a housing such as shown in Fig. 31 would be used, namely, the housing H'. This, however, is a matter which will be taken up later. These directions of travel are indicated in Fig. 7 by various arrows.

Passing now to a consideration of the channels of the bottom of the vat, it will be seen that these are associated with a gutter 80 which extends from a point adjacent to the center of the bottom outward radially to its outer edge. The bottom of the gutter 80 is given a downward and outward inclination so that liquid within the tank may be drained to the outer edge of the tank through a suitable discharge opening formed by the valve casing 81. The opening through the case 81 is controlled by a plug valve 82 manually operated by a handle 83. A nut 84 and washer 85 cooperate with a threaded stud 86 on the end of the valve 82 to provide proper adjustment of the valve in its seat formed in the casing 81. The inner end of the valve casing 81 is suitably secured to the vat walls by welding or the like. Its outer end is threaded for connection with a suitable discharge pipe. It will be noted that the upper edges of the gutter 80, which is composed of sheet metal, terminate at the level of the bottom 41 and are suitably secured thereto by welding.

The wall of the gutter 80 forms a barrier at which the various constituent nested loops 47, 48, 49, 50, 51, 52 and 53 terminate. In other words, the various loops outside the central disk-like plate 47 are loops which do not meet at their ends but abut against the walls of the gutter 80. These gutter walls serve in certain instances in determining the path of travel of the fluid through the bottom channels, as did the bulkhead partitions of the channel arrangement of the wall A.

Upon following out the openings provided by cutting away portions of the flanges of the bottom channel members, we see that the flange of member 52 is cut away to provide an opening 87 adjacent to one side of the gutter 80 and it is cut away at its opposite end to provide an opening 88 near the other side of the gutter 80. When it comes to the flange of the member 51 we find that it is provided with a wide opening 89 that extends from the point 90 to the adjacent wall of the gutter 80 on that side of the gutter which is adjacent to the opening 88. Upon coming to the member 50 we find it is provided with two openings 91 and 92 at its opposite ends in a way similar to the flange of member 52. Coming to the member 49 we find that its flange is provided with a wide opening 93 which extends from the point 94 to the adjacent wall of the gutter 80 and is located on that side of the gutter which is adjacent to the opening 91. The member 48 in turn has its flange ends cut away to provide openings 95 and 96. The flange of the member 47 is not cut away except insofar as it is necessary to receive the gutter 80. In this respect it is like the outermost member 53.

Figure 4:
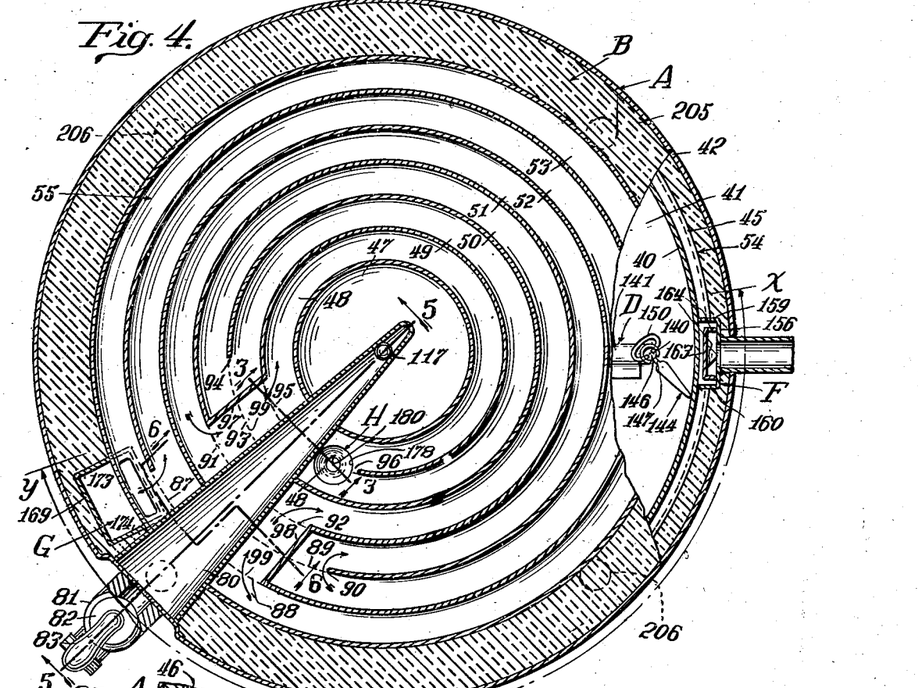
Fig. 4 is an irregular sectional view illustrating principally the channel forming angle-iron members of the vat bottom, the position of the section being indicated by the line 4—4 of Fig. 2.
Figure 5:
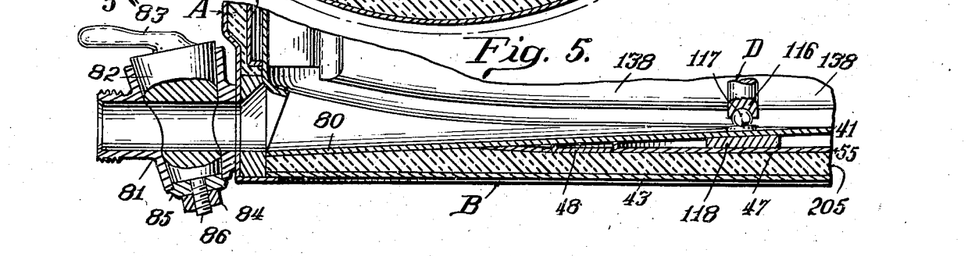
Fig. 5 is a radial vertical section through a portion of the vat bottom, illustrating particularly the draining gutter through which the vat contents flow when the vat is being emptied, the plane of section being indicated by the line 5—5 of Fig. 4.
Figure 6:
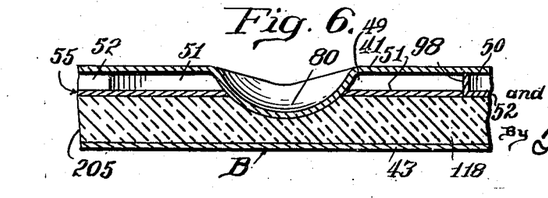
Fig. 6 is a transverse sectional view similar to Fig. 3 but taken nearer the gutter's outlet, the position of the section being indicated by the irregular line 6—6 of Fig. 4.

The arrangement shown in Fig. 4 is that wherein the stream of the medium travels in parallel paths, first in one direction and then in the other, from the receiving housing G to the discharge housing H. Thus, liquid entering from the housing G, will pass through the channels formed principally by the members 52 and 53. That portion flowing through the channel formed principally by the member 53 will encounter the wall of the gutter 80 and be deflected thereby through the opening 88, the left-hand portion of the opening 89 and the opening 92, into the channel formed principally by the member 50. At the same time, that portion of the double stream which passed through the channel formed principally by the member 52 will pass through the right-hand portion of opening 89 and the channel formed principally by the member 51. The double stream will then flow counter-clockwise through the channels formed principally by the members 50 and 51 until they approach the gutter 80 on the opposite side. When this point is reached the portion of the double stream which flows through the passage formed principally by the member 51 will encounter the gutter wall and pass through opening 91, the right-hand portion of opening 93 and opening 95 into the channel formed principally by the member 48. The other portion of the stream, namely, that flowing through the channel formed principally by the member 50, will pass through the left-hand portion of opening 93 into the channel formed principally by the member 49. Finally the double stream passing through the channels formed principally by members 48 and 49 will pass out through the outlet housing H.

It will be noted that in order to provide this path it was necessary to have two bulkhead members, namely, the members 97 and 98. These are located on opposite sides of the gutter 80 and spaced from it, as clearly shown. The bulkhead 97 divides the opening 93 and unites the flanges of the members 48 and 50. Similarly, the bulkhead 98 divides the opening 89 and is united to the flanges of the members 50 and 52. The direction of travel of the double stream is clearly indicated in Fig. 4 by the various arrows.

In cutting away the flanges of the bottom forming angle irons to provide the various openings just referred to, it should be noted that this cutting away takes place without interfering with the welding connections formed between the plate portions of the angle irons. In other words, the plate portions still remain welded together to maintain the angle plate wall 55. In the case of the bottom, these welds, where the openings are made, are indicated by dash lines 99, similar to the dash lines 59 of Fig. 7.

With the channel arrangements of Figs. 4 and 7 in service, it will be clear that the heat exchange medium will enter by the housing F and pass through the several wall channels, as previously indicated in connection with our consideration of Fig. 7, and then pass through the junction housing G into the channels indicated in Fig. 4 and travel through them as just traced and finally leave the vat at the housing H. Obviously, in some instances the direction of travel might be preferably opposite to that just given. In other words, the medium might enter by way of the housing H and leave by way of the housing F.

The medium employed will, of course, depend upon the kind of treatment to be given the liquid within the vat. If it is to be heated, then hot water or steam may be used as the heating medium. If it is to be cooled then cold water, brine, ammonia, or other suitable refrigerant, may be used. These are matters which are well known and need not be further discussed.

The vat is provided with a top and cover construction C. The structure includes primarily a bridging member 100 which is supported at its opposite ends upon the wall A. This bridging member 100 thus leaves on either side of it a segmental opening into the vat. The bridging member is composed of metal and preferably has its opposite ends welded or otherwise permanently secured to the upper ends of the wall structure A, the points of support being diametrically opposed. The bridge member 100 is a rather narrow member and has its longitudinal edges turned up to provide flanges 101. Lengthwise, the member 100 itself is inclined from a central high point to its ends where it engages the wall portions. At its center the member 100 is provided with a circular upturned flange 102. With this arrangement of flanges it will be seen that the bridge member 100 will carry off liquids which fall upon it and deliver them to the outer surfaces of the vat. As we shall see later, even oil drippings will pass in this way to the bridge member and be carried thereby to points beyond the vat.

At a point near its end the bridge 100 is provided with an aperture in which is located a receiving tube 103. This tube preferably is firmly secured to the bridge and terminates in an inclined portion which opens out toward the inner plate 40 of the wall structure. Thus, whenever a liquid is supplied to the interior of the vat, it will be directed at first against the outer heat exchanging wall. Obviously, the inlet tube 103 might be differently constructed and it might be very differently located than shown.

The longitudinal edges of the bridge member 100 have hinges located along them by which covers 104 may be hingedly supported. These covers are segmental in outline and along their straight sides each is provided with an upright flange 127 and a lateral flange 105, which lateral flanges, when the covers are down, overlap the bridge flanges 101. Toward the ends of the bridge member 100 there are cooperating lugs upon the bridge member and covers. The lugs 106 upon the bridge member 100 lie close to the lugs 107 upon the covers 104, there being one such pair, 106 and 107, for each hinge, and there being four hinges. One pair of hinges is associated with each cover and the edge of the bridge which lies near it. Thus there is one axis of rotation for each cover. The lugs 107 of each axis of rotation are provided with stud pins 108 which lie in said axis. These cooperate with a hole 137 in one lug 106 and a slot 109 in the other lug 106. Each slot 109 extends downward from the top of its lug at an angle of about fifteen (15) degrees from the vertical.

The covers have in turn at their outer edges inclined portions 110 which closely fit upon the inclined portions 44 at the top edge of the wall A. The covers 104 are also somewhat conical in form in order to fit upon the bridge 100 which is higher at its center than at its ends. When the covers are down tight upon the vat top, they have their top flanges 105 overlying the longitudinal bridge flanges 101. Their inclination outward and downward also insures that any liquids which may be deposited upon them will be carried to points beyond possible entrance into the vat. Obviously, with the separable pin hinges in service, the covers can be readily removed individually from the bridge. Thus removed, they and the bridge and the interior of the vat may be readily and thoroughly cleaned.

Obviously, the removal of a cover 104 is brought about by lifting it up in such a way as to free its apertured and slotted lugs 106 from the bridge lugs 107. This is done by manipulating the cover first to move the one pin 108 out of the slot 109 and then the other pin 108 out of the aperture 137. To replace the cover, the operations will be similar but in the reverse order, as will be obvious.

Coming now to the agitator D, it will be noted that its shaft, which lies in the vertical axis of the vat, is made up of two lengths, a lower long length and an upper short length coupled together when the agitator is in service. The lower length, which may be variously formed, is in the present instance made up of a long tube 111 and a short rod 112 plugged into the upper end of the tube. Fitting the tube and rod together in this way provides a shoulder 113 at the upper end of the tube. The upper short length of the agitator shaft is preferably solid and of the same diameter as the rod portion of the long length. This upper length, designated 114, and the rod 112 of the lower length of shaft cooperate with each other and with a coupling sleeve 115 to unite the shaft lengths into a single operative shaft.

The lower end of the tube 111 is provided at its foot with a socket bearing 116 which is adapted to rest on a ball bearing 117 carried by the bottom of the vat. Preferably the bearing 117 is secured to the inner surface of the vat bottom. In the present instance this surface is found in the bottom of the gutter 80. Of course, if the gutter were somewhat differently located then the bearing 117 would be secured to the plate 41. The under side of the bottom plate to which the bearing is secured is backed up by a suitable backing member 118. In the present instance this is merely a block of metal positioned between the gutter 18 on the one hand and the central channel-forming member 47 on the other hand. Obviously, this thrust bearing at the lower end of the agitator shaft may be variously constructed. What is shown is merely illustrative.

The upper end of the portion 112 of the lower shaft length is cut away on one side so as to produce a notch 119 having a shoulder 120 which is positioned at right angles to the axis of the shaft. This shoulder 120 cooperates with a second shoulder 121 in a notch 122 formed at the lower end of the short shaft length 114. When the two shoulders 120 and 121 engage each other and the sleeve 115 is in coupling position, then the two lengths of the agitator shaft will be in alinement. In order to hold the sleeve 115 in its proper coupling position it is provided with a bayonet slot 123 which cooperates with a stud 124 upon the short length 114. It will be seen that when the sleeve 115 is in holding position, the stud 124 will lie in the end 125 of the bayonet slot 123. When the sleeve is to be moved out of coupling position, then the sleeve is moved lengthwise so that the stud 124 passes downward from the short end 125 of the slot; then the sleeve is rotated to bring the stud 124 to the longer portion 126 of the slot; when in line with this portion, the sleeve may be again moved longitudinally to free the stud entirely from the slot. And then when the sleeve 115 is moved down into engagement with the shoulder 113, the two shaft lengths will be entirely free of each other. Then the lengths may be readily separated. When it is desired to couple the two parts of the agitator shaft, then it is only necessary to bring the shoulders 120 and 121 into engagement and slip the sleeve 115 up into coupling position where it may be locked by the stud 124 and the bayonet slot 123.

At this point it may be noted that when removing the agitator from the interior of the vat, the scraper sections 144 are first removed from the tubular uprights 140. When this is done, the over all dimension of the agitator frame, through and including the uprights 140, is sufficiently less than the length of the segmental openings in the top of the vat so that the entire agitator frame (the scraper sections being removed) can be passed through one of these segmental openings.

The upper end of the short length 114 of the agitator shaft is connected with the proper gearing element of a reduction gear 128. The casing of this gear 128 is connected to the casing of an electric motor 129 and the gearing is arranged so that the vertical agitator shaft will be driven through it by the electric motor, a proper reduction in speed being obtained by the gearing 128. The combined gearing and motor casing is supported upon four legs 130, 131, 132 and 133. These legs are secured at their lower ends to the bridge 100. At their upper ends the legs 130 and 131 are secured to a bracket 133 which forms part of the casing of the motor 129. On the other hand, the legs 132 and 133 are secured at their upper ends to a bracket 134 forming part of the casing of the reduction gear 128. The short shaft length 114 extends down through the opening in the center of the bridge 100, which opening is surrounded by the upturned flange 102.

In order to keep oil drippings from passing from the gearing of the reduction gear 128 down into the interior of the vat, the short shaft section 114 is provided with a hat shaped flange 135 which extends far enough to deliver drippings outward of the bridge flange 102. Of course, the member 135 is apertured to pass the shaft section 114 and is firmly secured to it. As an additional precaution the coupling sleeve 115 is surrounded by a second flange or hat-like member 136. This member is nearer to the bridge flange 102 and, as clearly shown, extends outward of it so as to deliver drippings to the cover parts at points outward of the flange 102. It also protects the central opening within the flange 102 from receiving splashes of objectionable liquids. The oil hat 136 is removable. To this end it is split and fitted together with interlocking projections and recesses. Such split rings are common in the art and the same need not be further described. When the coupling sleeve 115 is to be moved from the coupling position to the uncoupling position, then the lower hat 136 is first separated and removed. Then the coupling sleeve is free and accessible for manipulation.

Figures 10, 11, 12:
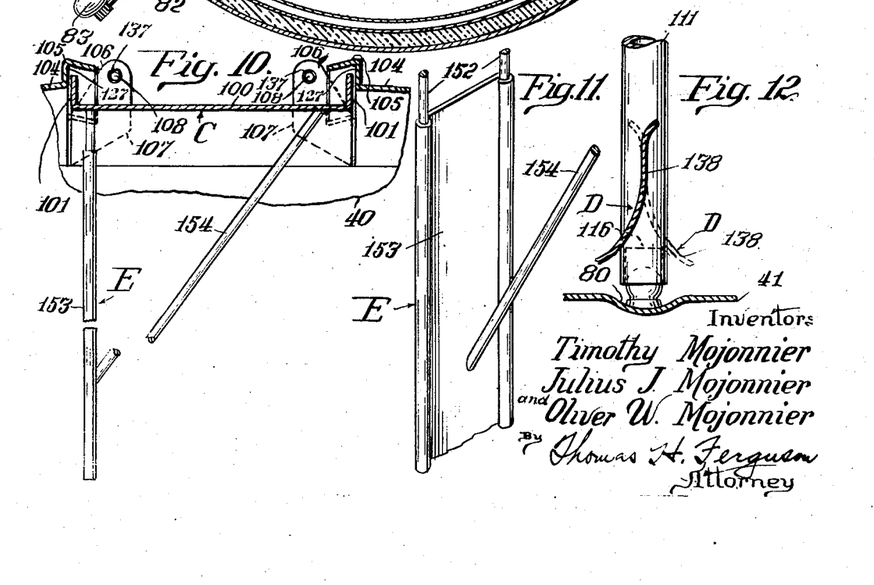
Fig. 10 is a transverse sectional view through the bridge, illustrating also the baffle which is carried by the bridge, the plane of section being indicated by the line 10—10 of Fig. 2.
Fig. 11 is a perspective view of a portion of the baffle and its supporting strut.
Fig. 12 is a transverse section through one blade of the agitator, taken at a point adjacent to the agitator shaft, as indicated by the line 12—12 of Fig. 2.

At the lower end of the agitator shaft are two oppositely extending transverse blades 138. These are shaped so as to engage the substance within the vat and force it upward as the blades are rotated. This means that the blade on one side of the agitator shaft has a curvature in one direction and that on the other side of the shaft it has a curvature in the opposite direction. This curvature is clearly indicated by the section of Fig. 12. Besides having this upward plowing action due to the transverse curvature of the blades, the latter are longitudinally shaped along their lower edges so as to have a path of travel which lies adjacent to the dished bottom 41 of the vat and at all points practically the same distance therefrom. These blades 138 form part of the frame structure of the agitator.

Figure 2:
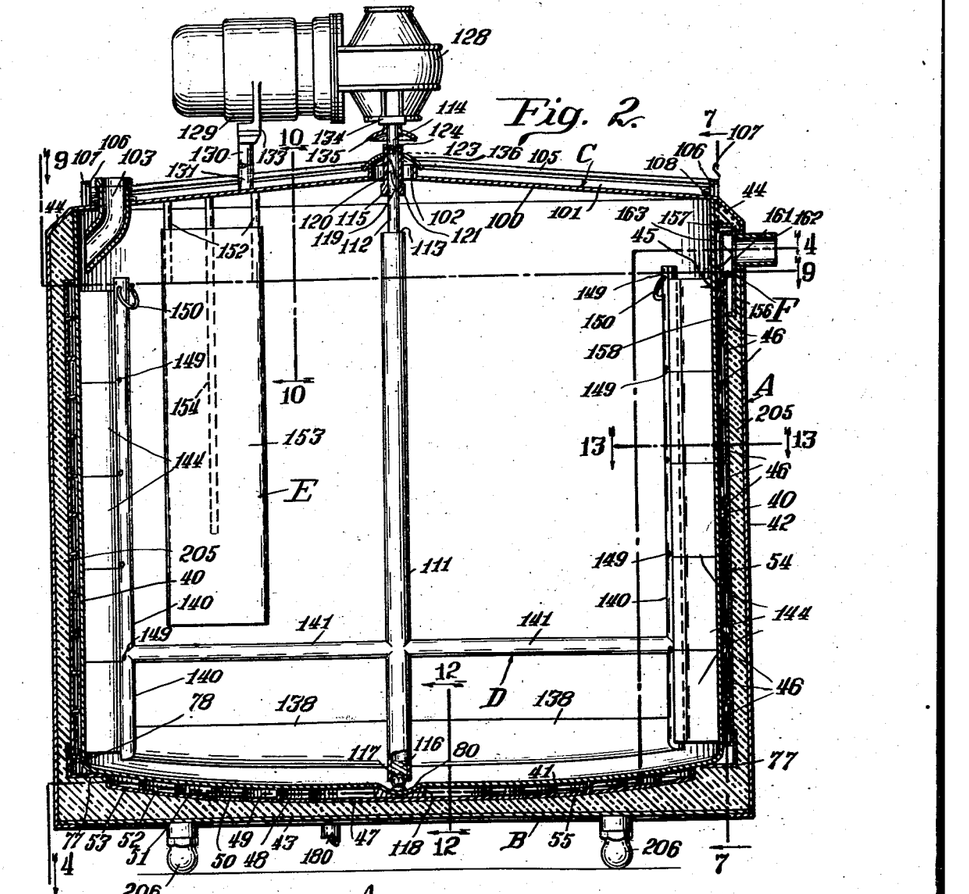
Fig. 2 is a central vertical section of the vat, the plane of section being lengthwise of the cover carrying bridge.

From the outer ends of these blades which, in a sense, constitute a single transverse member secured at its center, there arise uprights 140. There are also radial bracing members 141 which are positioned above the blades 138. These members 141 are secured at their inner ends to the shaft tube 111 and at their outer ends they are secured to the uprights 140. Two such uprights are employed. They are the same in construction. Preferably, each upright 140 takes the form of a slotted tube. At its lower end a block 143 of metal is inserted in the tube and welded to it. The associated blade 138 is secured to the upright at the point where the block 143 is located. The block 143 serves as an end support for the scrapers 144 which are arranged to be carried by the upright and to be mounted therein in sections as a stack. The lowermost scraper or scraper section 144 will engage the block 143, the next section 144 will engage the section 144 beneath it, and so on throughout the several sections in the stack. As shown in Fig. 2, five scrapers or scraper sections are carried by each of the uprights 140.

Figures 13, 14, 15, 16:
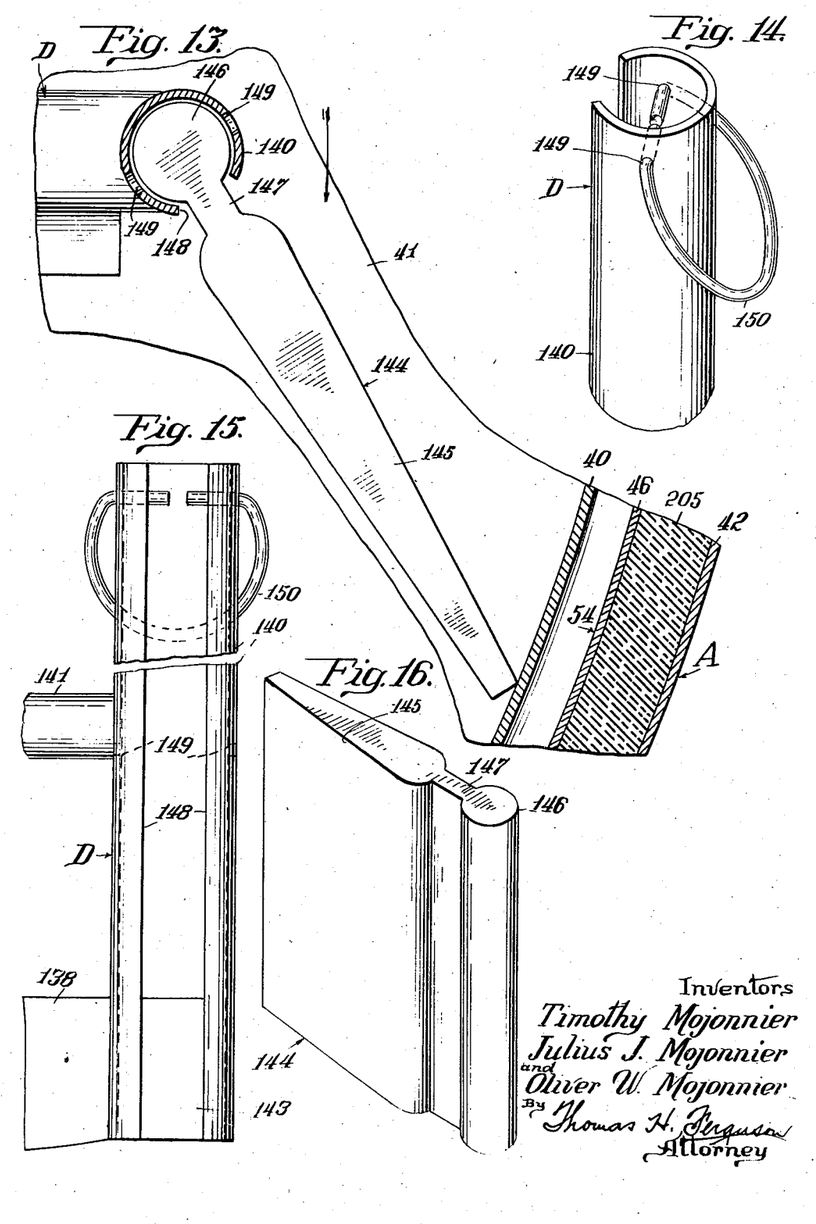
Fig. 13 is a fragmentary view illustrating upon a large scale one of the scrapers in association with the tank wall and other parts, the upright and tank being shown in section, the plane of section being indicated by the line 13—13 of Fig. 2.
Fig. 14 is a perspective view of the upper end of one of the scraper carrying uprights, showing the retaining ring in position but without any of the scrapers therein.
Fig. 15 is an elevation of one of the scraper carrying uprights, a portion of the center of it being broken away to reduce the size of the figure.
Fig. 16 is a perspective view of a detached scraper or scraper section.

The scrapers 144 include a flat slab-like body 145, a cylindrical head 146, and an interconnecting neck 147. The head 146 is of slightly less diameter than the interior of the tubular upright 140 so that it may be slipped freely into it. The neck 147 also has a width which is somewhat less than the width of the slot 148 in the upright 140. As a result of this construction, the slab 145 of a positioned scraper may be moved laterally with reference to the upright 140. The play between the slab and the upright permits the outer end of the slab 145 to engage the inner wall 40 of the vat with some freedom of oscillation. The direction of travel of the scrapers is, so to speak, against the material in the vat. This is indicated by the arrow in Fig. 13. Because of this direction of travel, the mass of material which encounters the scrapers, forces their outer ends against the vat wall, and, as they travel around, they scrape the wall and remove the material in the vat from it. As the scrapers travel in this way around the wall 40, each scraper has its own zone to scrape, and will adjust itself independently of the other scrapers according to the wall irregularities which it encounters.

In order to keep the scrapers 144 in the uprights, and to prevent their movement out of their zones, the upright is provided with a number of openings 149 which are in pairs directly opposite each other, and serve to receive the ends of a retaining ring 150 which is made of resilient material such that it may be sprung enough to be withdrawn through the openings 149 when it is to be removed and sprung enough to be passed through those openings when it is to be placed in position. The openings 149 are arranged at different heights along the uprights, and their positions are such that each pair of holes may be used with a ring, such as illustrated. Thus, it is possible to place within the vat a single pair of scrapers, thereby providing a one-high scraper structure; or two pairs, thereby providing a two-high structure; or three for a three-high structure; or any higher desired number to provide higher structures, all of course in keeping with the height of the uprights and the sizes of the individual scrapers. The holes 149 along the uprights 140 are positioned so as to come at the tops of the different pairs of scrapers when thus set. Consequently each stack, whatever its height, may be firmly held by those rings which are placed at the top of the stack in any particular instance.

As previously pointed out, the inner vat wall 40 is composed of metal and preferably a metal which will be incontaminable to milk or any other substances with which the vat is to be used. On the other, the scrapers 144 are preferably composed of a much softer material. As a result, all of the wear which is occasioned by the rubbing of the scrapers upon the wall is taken up by the scrapers, which can be readily replaced. Preferably, too, the scrapers are of such material that they will not injure the product that is being handled by the vat. In case the vats are for handling milk or milk products, the scrapers are composed of a compound available on the market and known as "dairy plastic."

In this connection it may be pointed out that the scraper supports 140 must extend upward in a direction parallel to the wall 40 which is being scraped. In the embodiment shown, this direction is vertical. Obviously, it need not be vertical but may be inclined. So an upwardly and outwardly inclined wall may be associated with similarly inclined scrapers. All of this is quite obvious and it seems unnecessary to add further illustration.

In association with the agitator D, we preferably employ a baffle E. The latter includes a pair of downwardly extending rods 152 between which extends a metal plate 153 which is curled at its sides so as to embrace the rods 152. The rods 152 extend downward from the bridge 100 of the cover structure. The material carried about in the vat and agitated by the scrapers and other parts, engages the face of the plate 153, and in order to resist the force of the same, the latter is provided with a brace rod 154 which at its lower end is secured to the rear side of the plate 153 and at its upper end is secured to the bridge 100. As clearly shown, the rods 152 are connected near one edge of the bridge while the rod 154 is connected to the bridge near its other edge. The baffle is positioned inward of the path of travel of the uprights 140 and a suitable space is provided between the same to allow for the ready travel of the substance within the vat as the agitator is being rotated.

In order to provide proper channel connections from the pipes which supply and carry off the heat exchange medium, we employ, as before noted, housings F, G and H, the housings F and H being terminal housings, and the housing G being a junction housing adapted to bring about connection between the wall channels and the bottom channels. These may now be more fully considered.

Figures 17, 18, 19, 20, 21, 22, 23:
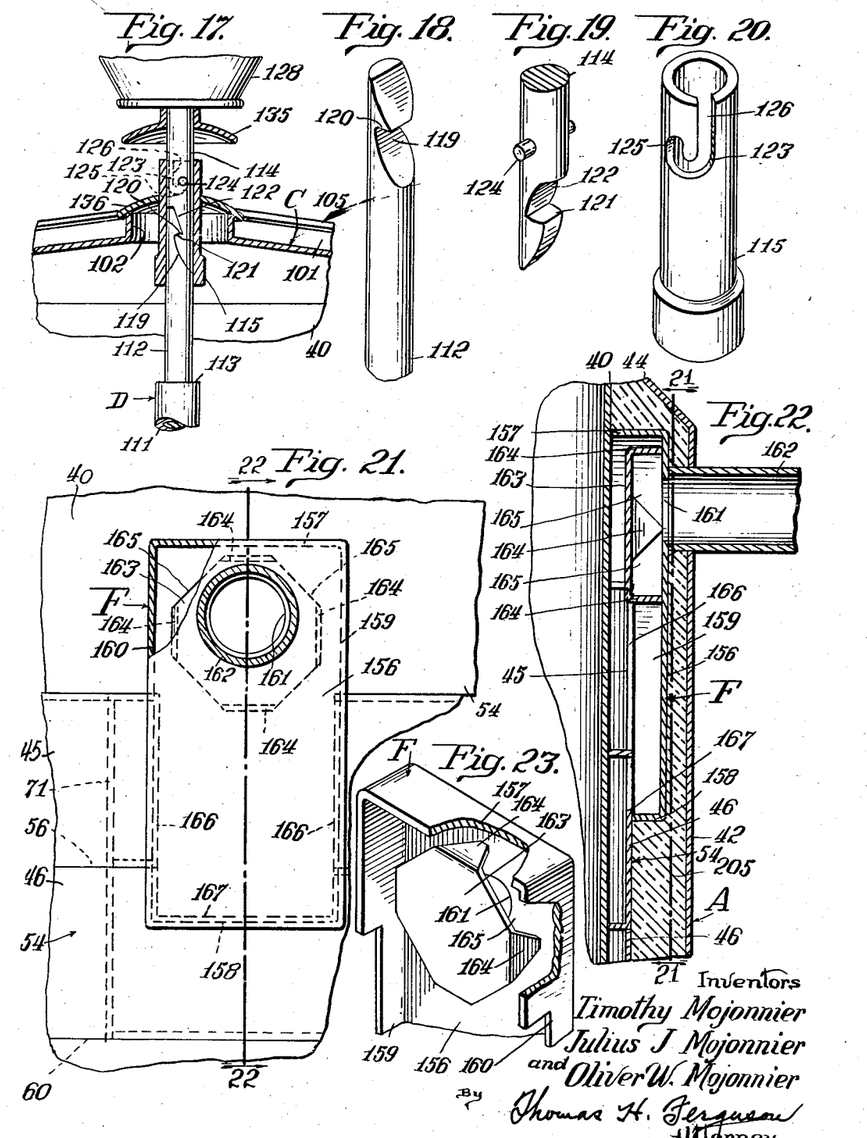
Fig. 17 is a central vertical section through a portion of the bridge and the associated coupling by which the agitator shaft lengths are secured together.
Fig. 18 is a perspective view of the upper locking end of the lower longer length of the agitator shaft.
Fig. 19 is a similar view of the lower locking end of the upper agitator shaft length.
Fig. 20 is a perspective view of the coupling sleeve by which the shaft lengths are secured together.
Fig. 21 is an elevation of one of the terminal housings and an associated connecting pipe, the view being taken inwardly of the outer casing of the vat as indicated by the line 21—21 of Fig. 22, and the insulation being omitted.
Fig. 22 is a vertical section of the same housing and pipe connection, the section, however, including also the outer casing of the vat, the plane of section being indicated by the line 22—22 of Fig. 21.
Fig. 23 is a perspective view of the housing of Fig. 21, removed from the other parts and with wall and end portions broken away so as to particularly illustrate the inclosed baffle.

The housing F, shown more particularly in Figs. 21, 22, 23, has been mentioned heretofore as the inlet housing. It may also be termed a terminal housing or port. For our purposes it may be described as an inlet, although it might be an outlet should the direction of flow be reversed. As clearly shown, this housing includes a face wall 156, end walls 157 and 158, and side walls 159 and 160. The front wall 156 is apertured near its upper end as indicated at 161. An intake pipe 162 registers with the opening 161 and is secured at its end to the face plate 156. Upon entering the housing from the pipe 162 the medium encounters a baffle plate 163.

This plate has laterally extending lugs 164 which are somewhat triangular in shape and are welded at their points to the inner face of the housing wall 156. With this construction, the medium coming against the baffle plate 163 is distributed through the several openings 165 between the lugs 164 and thus spreads itself upon entering the housing. The housing itself is fitted to the plate 40, the angle iron member 45 and the uppermost of the angle iron members 46. The housing wall 157 is therefore longer than the wall 158, since the wall 157 must reach the wall 40 and the wall 158 need only reach the angle iron wall 54. At proper points, the side walls 159 and 160 are cut down in width to meet the requirements occasioned by fitting the housing to the angle irons and to the wall plate 40. When the housing F is in position against the plate 40 and the angle iron members, then the medium may pass into the two uppermost channels of the wall channel structure. This is in agreement with the channel arrangement of Fig. 7. To obtain a free passage, the angle irons are cut away as indicated by the dotted lines 166 and 167 in Fig. 21.

Figure 24:
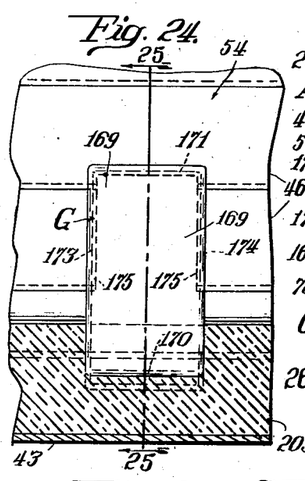
Fig. 24 is a view similar to Fig. 21 illustrating a junction housing employed for establishing communication between the channels of the side wall and bottom of the vat, the position of the view being indicated by the line 24—24 of Fig. 25, and the insulation beneath the bottom only being shown.
Figures 25, 26:
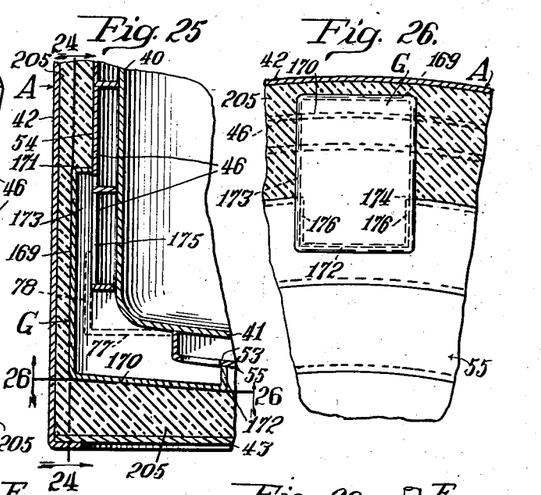
Fig. 25 is a vertical section similar to Fig. 22 illustrating the junction housing in position, the plane of section being indicated by the line 25—25 of Fig. 24.
Fig. 26 is an underneath view which illustrates the same junction housing independently of the bottom inclosing casing wall, the position of the view being indicated by the line 26—26 of Fig. 25, and the insulation in the wall only being shown.

Passing next to the junction housing G, it will be seen that the same is illustrated in detail in Figs. 24, 25 and 26. As there shown, the housing has a face plate 169, a bottom 170, an upper end 171, a lower end 172, and suitably shaped side walls 173 and 174. This housing, as in the case of the housing F, overlaps angle iron members which go to make up channels for the medium. The vertical portion of the housing G overlaps the lowest two angle irons 46 of the side wall construction and its more or less horizontal portion or bottom 170 overlaps a portion of the one angle iron member 53 of the bottom construction. All the edges of the housing are secured to the adjacent angle irons or to the continuous plate formed by the side wall 40 and the bottom wall 41. Again, it is necessary to cut away portions of the angle iron structure and this is done by cutting along lines 175 and 176. In this way the medium flowing through the lowermost two channels in the wall passes into the housing G and from that housing into the outer channel formed principally by the member 53, and then, by reason of the opening 87 in the channel of the member 52, the medium also passes into the channel formed principally by the member 52. Thus at both ends of the housing there are inlets from two channels on the one hand and outlets into two channels on the other hand.

Figure 3:
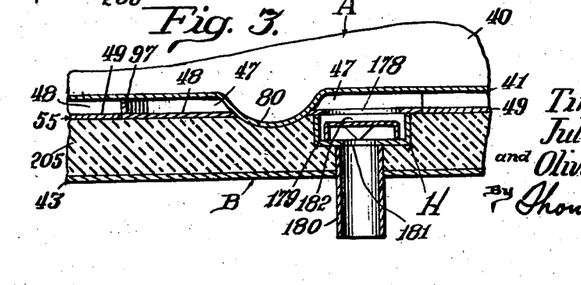
Fig. 3 is a fragmentary sectional view through a portion of the vat bottom showing the lowermost terminal housing which ordinarily constitutes the outlet for the fluid passing through the vat channels.

Passing now to the outlet housing H, it will be seen that the same is most fully illustrated in Fig. 3 while its location in plan is shown more particularly in Fig. 4. Obviously, this housing, like the housing F, may be termed a terminal housing or port. This is because it may be used as either inlet or outlet. But here it will be referred to as an outlet. Obviously, the medium from the channels formed principally by the members 48 and 49 will pass at once through opening 178 into the box-like enclosure 179 which constitutes the main portion of the housing H. A pipe 180 is secured at its inner end to the housing enclosure 179 and through the opening 181 receives the medium delivered, as just stated. In order to retard the flow, the housing H is provided with a baffle 182 which is the same in construction as the baffle 183 shown particularly in Fig. 23 and described at length heretofore. Obviously, if the direction of flow be reversed, so that the medium enter by the housing H and depart by the housing F, then the baffle 182 would serve to break up the incoming stream as it entered into the channels of the bottom B.

In some instances it may be desirable to construct the vat without any bottom channels for the heat exchange medium. In such case the medium might enter at the housing F and pass out at the point where the housing G is located. In such a case the housing G would need to be modified. This would be true whether the medium flowed from the housing F to the housing G, or in the opposite direction. In Fig. 31 a modified housing H', suited to such operation, is shown. In this instance the lowermost pair of angle irons 46 is overlapped by the wall 184 of the housing H' just as in the case of the housing G. On the other hand, the bottom 185 of the housing H' must be furnished with a much longer end 186, such an end being required to engage the bottom wall 41 instead of the plate portion of the angle iron 53, such an angle iron not now being used. With the housing H' fitted to the angle irons 46 and the associated walls 40 and 41, the interior of the housing will be connected directly with the lowermost pair of channels of the wall structure. To provide a terminal connection, the bottom 185 is preferably left with an opening 187 which is inclosed by a box-like enclosure 188 which in turn has a central opening which communicates with the pipe 189. In this instance a baffle 190 is located within the housing 188 directly opposite the end of the pipe 189. This baffle is the same in construction as the baffles 163 and 179 heretofore described. As before stated, the medium may flow into the channels through the pipe 189 and out by way of the pipe 162 or the direction of flow may be the reverse.

In working up the present invention in its different forms, it is not necessary in every instance, to use bulkheads or partitions such as the bulkheads 97 and 98 shown in Fig. 4. In some instances, it may suffice to rely upon openings cut through the flanges of the bottom structure, and only through those flanges, to give the necessary meandering paths for the heat exchange medium. An illustration of such an arrangement is presented in Fig. 32.

The structure of this vat bottom, designated B', illustrates a further modification in the arrangement of the angle-irons. In this instance, the center member of the channel structure is not a flanged disk like the flanged disk 47 of the previously described embodiment, but takes the form of an angle-iron ring 194 which is in itself a channel iron, that is to say, an iron having a rather large plate portion and two flanges. The next member outward of the member 194, namely, the member 195, is a ring which has only one upturned flange, and that flange is formed at its outer edge. Similarly the members 196, 197, 198 and 199 are loops or rings of successively larger diameters, such that they will nest together with the inner edge of each engaging the outer edge of the next one in order. With this construction the plate-like portions are welded together, as before, so as to form an outer angle-iron wall which, as a whole, may be designated 193.

In this instance the medium passing from the lowest pair of side wall channels would enter the housing G, as before, and from the latter pass on its way to the outlet housing H, it would follow a very different path than in the case of the arrangement in Fig. 4. As shown in Fig. 32, the channel member 194 has its flange cut away to provide an opening 200. Similarly, the flange of member 195 is cut away to provide an opening 201. Again, the flange of member 196 is cut away to provide an opening 202. Again, the flange of member 197 is cut away to provide an opening 203. And finally the flange of member 198 is cut away to provide an opening 204. The openings 200, 202, and 204 are on one side of the center of the bottom, while the openings 201 and 203 are on the other side of the center.

In all these cases where the flanges are cut away to form these openings, the plate portions of the angle irons remain welded together. In other words, the cutting away does not affect the welds. In these instances, the welds are represented by dash lines, designated 207.

The medium entering from the housing G will pass in opposite directions through the channel formed principally by the member 199 until the two streams meet at the opening 204. Then, after passing through said opening, the medium will pass again in two streams in opposite directions through the channel formed principally by the member 198 until they meet at the opening 203. Upon passing through this opening the same will again travel in two streams in opposite directions through the channel formed principally by the member 197 until the opening 202 is reached. Upon passing through this opening, the medium will again travel in two streams flowing in opposite directions through the channel formed principally by the member 196 until the opening 201 is reached. After passing through this opening, the medium will again flow in oppositely directed streams through the channel formed principally by the member 195 until they meet at the opening 200. Upon passing through this opening, the streams will continue in opposite directions through the channel formed principally by the member 194 until they come to the outlet H. The directional flow of these streams is indicated in Fig. 32 by arrows.

Although nothing has been said heretofore about heat insulation, it will be noted that a suitable insulation 205 is placed within the outer casing of the vat formed by the peripheral wall 42 and the bottom wall 43. It will also be noted that this insulation will be on the outside of the housings F, G, H and H'. In other words, these housings are made flat and when finally positioned, leave space between them and the enclosing shell of the vat. This insures the presence of a reasonable amount of heat insulating material between the housings and the outer wall and bottom of the vat.

Likewise, in the previous description nothing has been said about the mounting of the vat. Preferably the same is provided with four feet 206 and these are suitably secured to the bottom plate 43 of the vat structure. They may be positioned as indicated by dotted lines in Fig. 4.

In the case of the structure of Figs. 32 and 33, the thrust bearing member 117 is backed as before by a block of metal. This time the block, designated 213, is located between the bottom plates 41 and 43 and is suitably secured thereto preferably by welding.

Figures 27, 28, 29, 30:
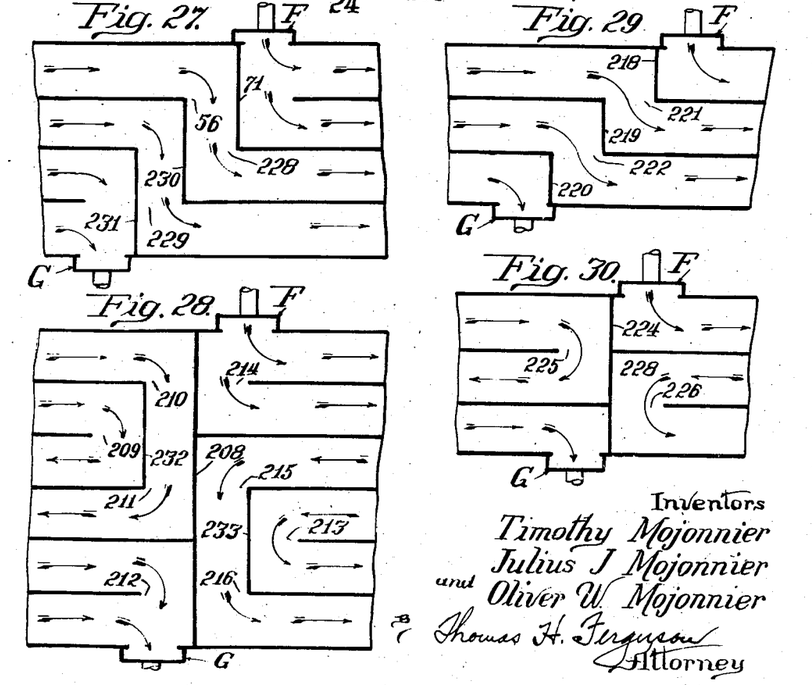
Fig. 27 is a diagram illustrating in simple form a double channel path from a receiving point extending through the side wall structure to an outlet point. This arrangement is the same as that of the preceding figures except that the side wall is here only four channels high instead of being twelve channels high as in the previously described construction.
Fig. 28 is another diagram illustrating in simple form a six channel high structure wherein the medium passes first in one direction and then in another between the terminal housings.
Fig. 29 is a diagram of a three channel high structure wherein the travel of the fluid is in one direction from the receiving housing to the exit housing and wherein the channels are in series and not in parallel.
Fig. 30 is a similar diagram of a structure similar to Fig. 29 but showing an arrangement in passing from one terminal housing to the other, whereby the medium must flow first in one direction and then in the other.

The diagrams of Figs. 27 to 30 inclusive indicate modified paths of travel for the heat exchange medium. In Fig. 27 the arrangement is similar to that heretofore described in connection with Fig. 7 but in this instance the number of channel-forming angle-iron members is reduced to four and the parallel paths are kept separate and distinct throughout the entire travel from the receiving housing F to the delivering housing G. These parallel paths are obtained by differently arranged bulkheads and flange openings. The wide opening 56 and the bulkhead 71 are the same as in Fig. 7. But the flanges below that having the opening 56 are cut away to provide wide openings 228 and 229. Bulkheads 230 and 231, respectively, bisect these openings. The bulkhead ends are connected as shown. Thus, each of the two parallel paths extending from housing F to housing G, makes practically two complete circles around the exchanger without coming together at intermediate points to intermingle their contents. In the arrangement of Fig. 7, there is a coming together, and consequently a chance for intermingling, after each circle of transit.

Fig. 28 is a similar diagram and shows a continuous partition 208 which extends throughout the height of the wall, and the flanges in this instance are cut off so as to provide a wide opening 209 and narrow openings 210, 211 and 212 at the left of the partition 208, and a wide opening 213 and narrow openings 214, 215 and 216 at the right of said partition. It will be noted, too, that those flanges lying between the openings 211 and 212 on the left and between the openings 214 and 215 on the right extend up, and are joined, to the partition 208. As shown, the bulkhead 232 bisects the wide opening 209 and the bulkhead 233 bisects the wide opening 213. These bulkheads have their ends connected to the flanges as clearly shown in Fig. 28. The resulting flow is in side by side paths which are kept separate and distinct from the housing F to the housing G but the arrangement is such that there is a reversal in the direction of flow of each of the two parallel streams whenever they approach the dividing bulkhead 208 and the bulkheads 232 and 233 associated with it.

In Fig. 29 the arrangement is perhaps the simplest. The flow is in a single channel and is not reversed at any time. This is brought about by bulkheads 218, 219 and 220, and openings 221 and 222.

In Fig. 30 we also have the same channel height as in Fig. 29, but in this instance the direction of flow is reversed after one complete traverse in either direction. This is brought about by a partition or bulkhead 224 which extends the full height of the wall. In association with this bulkhead are openings 225 and 226.

In the diagrams of these figures, 27 to 30, inclusive, the several arrows show the direction of the flow of the medium in passing from the housing F to the housing G.

Obviously, in carrying out the invention, still other alterations and modifications may be made than those heretofore pointed out. Accordingly we do not wish to be limited to the exact embodiment herein disclosed but aim to cover by the terms of the appended claims all those alterations and modifications which rightly come within the scope of the invention.

We claim:

1. A vat of the class described comprising a fluid-contacting side wall and a fluid-contacting bottom secured together and forming a fluid-contacting shell, a supplemental wall outward of said fluid-contacting wall and spaced from the same, a series of horizontal members extending between said side wall and said supplemental wall dividing said space into parallel channels, housings communicating with the uppermost and lowermost channels and spaced peripherally of the vat, and a series of bulkheads cooperating with openings in said horizontal members, said bulkheads and openings alternating in a line between said housings, one end bulkhead being located at one side of one of said housings and the other bulkhead being located at the other side of the other of said housings, said bulkheads and openings cooperating to guide the flow first along one level, then passing through an opening to another, and then at that level, and so on, the same providing a unidirectional flow from one housing to the other.

2. A vat of the class described comprising a fluid-contacting side wall and a fluid-contacting bottom secured together and forming a fluid-contacting shell, a supplemental wall outward of said fluid-contacting wall and spaced from the same, a series of horizontal members extending between said side wall and said supplemental wall dividing said space into parallel channels, housings communicating with the uppermost and lowermost channels and spaced peripherally of the vat, and a series of bulkheads cooperating with openings in said horizontal members, said bulkheads and openings alternating in a line between said housings, one end bulkhead being located at one side of one of said housings and the other bulkhead being located at the other side of the other of said housings, said openings being in each case as large in cross section as the cross section of at least one of the channels connected by said opening, said bulkheads and openings cooperating to guide the flow first along one level, then passing through an opening to another, and then at that level, and so on, the same providing a unidirectional flow from one housing to the other.

3. A vat of the class described comprising a fluid-contacting side wall and a fluid-contacting bottom secured together and forming a fluid-contacting shell, a supplemental wall outward of said fluid-contacting wall and spaced a short distance from the same, means extending between said side wall and said supplemental wall for providing with said plate and said supplemental wall a relatively flat channel path for a controlling medium, a flat terminal housing having a wall lying outward of and substantially parallel to said supplemental wall, said housing wall overlying a port in said supplemental wall, a pipe opening into the interior of said housing, an outer shell, and heat insulating material between said shells.

4. A vat of the class described comprising a fluid-contacting side wall and a fluid-contacting bottom secured together and forming a fluid-contacting shell, a supplemental wall outward of said fluid-contacting wall and spaced a short distance from the same, means extending between said side wall and said supplemental wall for providing with said plate and said supplemental wall a relatively flat channel path for a controlling medium, a flat terminal housing having a wall lying outward of and substantially parallel to said supplemental wall, said housing wall overlying a port in said supplemental wall, a pipe opening into the interior of said housing, a baffle plate within said housing opposite the open end of said pipe and embraced on a plurality of sides by free space, an outer shell, and heat insulating material between said shells.

5. A vat of the class described comprising a fluid-contacting side wall and a fluid-contacting bottom secured together and forming a fluid-contacting shell, a supplemental wall outward of said fluid-contacting wall and spaced a short distance from the same, means extending between said side wall and said supplemental wall providing with said plate and said supplemental wall a plurality of relatively flat channel paths for a controlling medium, a flat and shallow terminal housing having a wall lying outward of and substantially parallel to said supplemental wall, said housing wall overlying an opening or openings communicating with a plurality of said channel paths, a pipe opening into the interior of said housing, an outer shell, and heat insulating material between said shells.

6. A vat of the class described comprising a fluid-contacting side wall and a fluid-contacting bottom secured together and forming a fluid-contacting shell, a supplemental wall outward of said fluid-contacting wall and spaced a short distance from the same, means extending between said side wall and said supplemental wall providing with said plate and said supplemental wall a plurality of relatively flat channel paths for a controlling medium, a flat and shallow terminal housing having a wall lying outward of and substantially parallel to said supplemental wall, said housing wall overlying an opening or openings communicating with a plurality of said channel paths, a pipe opening into the interior of said housing, a baffle plate within said housing opposite the open end of said pipe and embraced on a plurality of sides by free space, an outer shell, and heat insulating material between said shells.

7. A vat of the class described comprising an inner fluid-contacting wall and an inner fluid-contacting bottom secured together and forming an inner vat shell, an outer side plate and a like outer bottom secured together and constituting an outer enclosing vat shell, a supplemental side wall located within the space between said shells and spaced a short distance from said fluid-contacting side wall, means extending between said fluid-contacting side wall and said supplemental side wall and cooperating with said walls to provide a channel path for a controlling medium, flat and shallow housings between said shells communicating with said chanels at inlet and outlet points, inlet and outlet pipes passing through openings in said housing walls and through openings in said outer shell into communication with the interiors of said terminal housings, and heat-insulating material embracing said channels and terminal housings within said outer shell.

8. A vat of the class described comprising an inner fluid-contacting wall and an inner fluid-contacting bottom secured together and forming an inner vat shell, an outer side plate and a like outer bottom secured together and constituting an outer enclosing vat shell, a supplemental side wall located within the space between said shells and spaced a short distance from said fluid-contacting side wall, means extending between said fluid-contacting side wall and said supplemental side wall and cooperating with said walls to provide a channel path for a controlling medium, flat and shallow housings between said shells communicating with said channels at inlet and outlet points, inlet and outlet pipes passing through openings in said housing walls and through openings in said outer shell into communication with the interiors of said terminal housings, baffle plates within said housings opposite the open ends of said pipes and embraced on all sides by free space, and heat-insulating material embracing said channels and terminal housings within said outer shell.

9. A vat of the class described comprising an inner fluid-contacting wall and an inner fluid-contacting bottom secured together and forming the inner shell of the vat, an outer side plate and like outer bottom secured together and constituting the outer shell of the vat, a supplemental side wall located in the space between said shells, a supplemental bottom wall, means between and cooperating with said supplemental side wall and said fluid-contacting wall to provide a channel path for a controlling medium, means between said supplemental bottom wall and said fluid-contacting bottom providing a channel path for a controlling medium, a flat junction housing within said space interconnecting said side channels with said bottom channels, terminal housings between said shells communicating with said channels at inlet and outlet points and spaced from said outer shell, inlet and outlet pipes passing through openings in said housing walls and through openings in said outer shell into communication with the interiors of said terminal housings, and heat-insulating material embracing said channels and terminal housings within said outer shell.

10. A vat of the class described comprising an inner fluid-contacting wall and an inner fluid-contacting bottom secured together and forming the inner shell of the vat, an outer side plate and like outer bottom secured together and constituting the outer shell of the vat, a supplemental side wall located in the space between said shells, a supplemental bottom wall, means between and cooperating with said supplemental side wall and said fluid-contacting wall to provide a channel path for a controlling medium, means between said supplemental bottom wall and said fluid-contacting bottom providing a channel path for a controlling medium, a flat junction housing within said space interconnecting said side channels with said bottom channels, terminal housings between said shells communicating with said channels at inlet and outlet points and spaced from said outer shell, inlet and outlet pipes passing through openings in said housing walls and through openings in said outer shell into communication with the interiors of said terminal housings, baffle plates within said housings opposite the open ends of said pipes and embraced on all sides by free space, and heat-insulating material embracing said channels and terminal housings within said outer shell.

TIMOTHY MOJONNIER.
JULIUS J. MOJONNIER.
OLIVER W. MOJONNIER.